United States Patent [19]

Komiyama

[11] 3,950,155

[45] Apr. 13, 1976

[54] AUTOMATIC AIR-PURIFYING SYSTEM

[75] Inventor: Uichi Komiyama, Kokubunji, Japan

[73] Assignee: Janome Sewing Machine Co., Ltd., Tokyo, Japan

[22] Filed: July 26, 1973

[21] Appl. No.: 382,979

[30] Foreign Application Priority Data

July 28, 1972 Japan.......................... 47-88815[U]

[52] U.S. Cl....................... 55/210; 55/274; 55/316; 55/387; 55/DIG. 34; 417/14; 340/237 R
[51] Int. Cl.²............................................ B01D 50/00
[58] Field of Search ............ 55/104, 279, 274, 210, 55/316, 387, 467, 470–473, DIG. 34; 417/14; 415/19; 98/115; 340/237 R, 237 S

[56] References Cited
UNITED STATES PATENTS

| | | | |
|---|---|---|---|
| 2,185,361 | 1/1940 | Towne | 340/237 |
| 3,516,232 | 6/1970 | Gilbertson | 55/387 |
| 3,518,814 | 7/1970 | Maynard | 55/210 |
| 3,625,135 | 12/1971 | Carlson | 98/115 |
| 3,690,245 | 9/1972 | Ferlise et al. | 98/115 |
| 3,693,327 | 9/1972 | Scheinberg | 55/274 |
| 3,765,842 | 10/1973 | Purt | 340/237 R |

Primary Examiner—Bernard Nozick
Attorney, Agent, or Firm—Michael S. Striker

[57] ABSTRACT

The system includes an electrically operated air-purifying unit for purifying the air in an at least substantially enclosed space. A sensor unit located in the enclosed space is operative for generating an electrical signal having valves indicative of the concentration of the impurities in the air contacting the sensor unit. A warning device issues a warning signal when the concentration of impurities in the air contacting the sensor unit exceeds a predetermined value.

7 Claims, 4 Drawing Figures

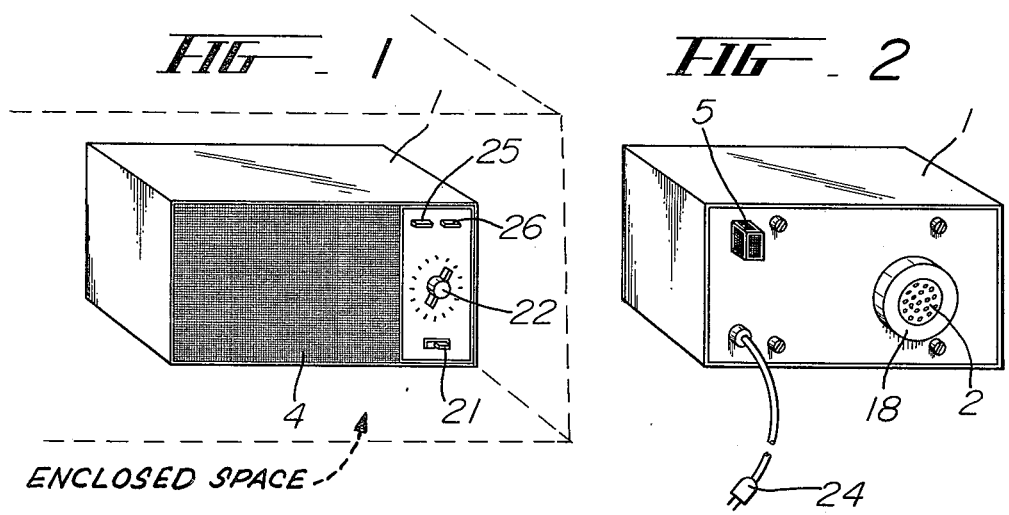
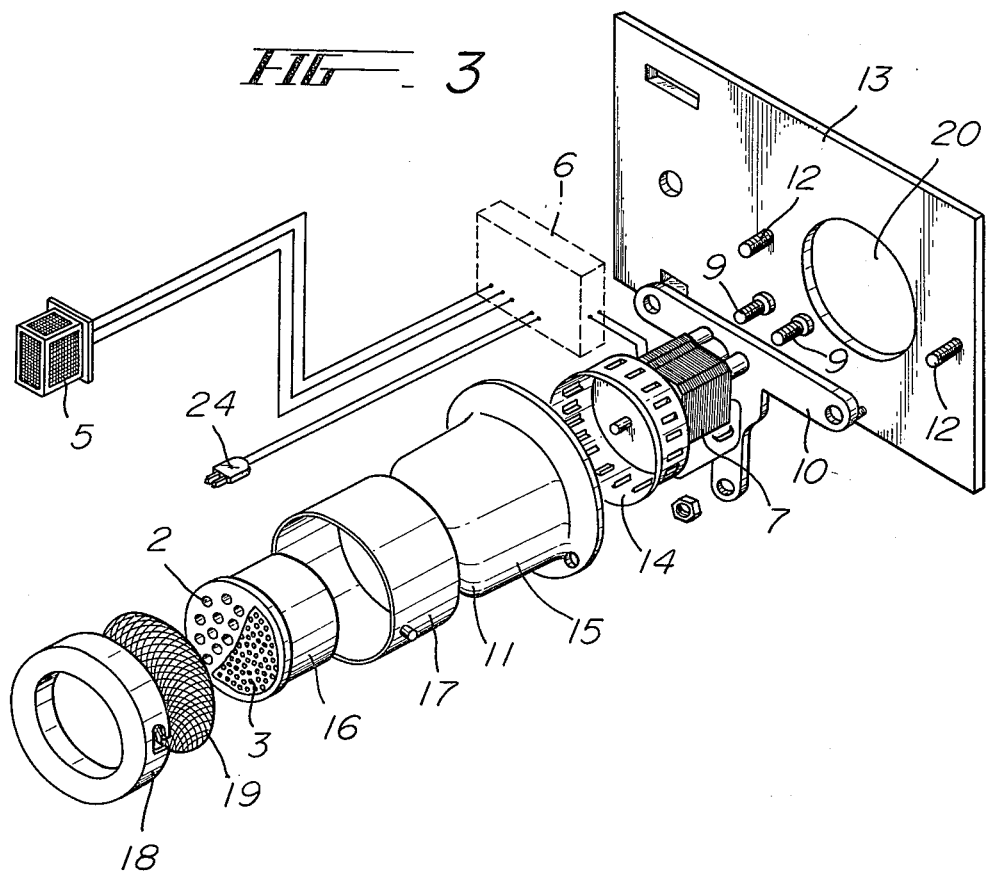

AUTOMATIC AIR-PURIFYING SYSTEM

BACKGROUND OF THE INVENTION

The invention relates to air conditioning systems in general and to air-purifying systems in particular.

Conventional air-purifying systems are usually provided with a pack of filters to absorb dust particles, gases injurious to health, and other impurities in the air. Usually, such arrangements are turned on manually, for example if the air in a room becomes unacceptably stuffy or if, in a garage or a factory, the air becomes significantly mixed with noxious gases or other impurities that are disagreeable or injurious to health.

Air-purifying systems which must be turned on and off manually are of little use if, for whatever reason, the occupant of the room provided with the air-purifying system fails to turn the system on. Moreover, in situations where the development of high concentrations of impurities sometimes occurs, for instance in garages and factories, the provision of the known air-purifying systems is of only limited benefit, and in some ways almost amounts to a danger; this is because an air-purifying system may have an air-purifying capability far below what is required to counteract the prevailing concentration of impurities, thereby giving the occupants of the room a false sense of security. This danger is particularly present, of course, when the impurities in question are odorless and invisible, for instance carbon monoxide. Even when the impurities are detectable by the occupants of a room, such detectability is largely without meaning if the occupants are asleep. Finally, as an additional disadvantage of the known air-purifying systems, in the event the concentration of impurities in the room being conditioned exceeds the purifying capability of the system, not only is the occupant of the room unaware of this; in addition, the motion imparted to the air in the room by the purifying system may well be such as to increase the concentration of dangerous impurities of the air of the room. For example, if dangerous impurities are entering a closed room through small leakage openings, the movement of air in the room established by the air-purifying system could well be such as to positively draw the impurities out of the small leakage openings at a rate significantly higher than would occur if the air-purifying system were not creating such a movement of air.

Additionally, it happens that the constructions of known air-purifying systems are in general rather complicated and expensive, particularly because they usually include a large number of costly mechanical parts. Also, the known air-purifying systems are sometimes unreliable in their operation.

SUMMARY OF THE INVENTION

It is a general object of the present invention to overcome the aforediscussed disadvantages of the prior-art air-purifying systems.

It is a particular object of the invention to provide a novel air-purifying system overcoming such disadvantages.

It is a specific object of the invention to provide an air-purifying system which overcomes the danger of the development of concentration of impurities greater than the corrective capability of the system, unbeknownst to the occupants of the room in which the system is provided.

It is another object of the invention to provide an air-purifying system whose operation is dependent upon the actual condition of the air in the room provided with the system.

It is a further object of the invention to provide an air-purifying system having a control arrangement comprised mainly of electronic and electrical components, and particularly semiconductor components, in order to increase the durability and reliability of the system as a whole, and in order to facilitate miniaturization of the control arrangement.

It is a further object of the present invention to provide a control arrangement for the air-purifying system which is not possessed of certain disadvantages inherent in prior-art air-purifying systems.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view of the exterior of one air-purifying system according to the invention as seen from the front;

FIG. 2 is a perspective view of the system shown in FIG. 1, but as seen from the rear;

FIG. 3 is an exploded view of a portion of the interior contents of the system shown in FIGS. 1 and 2.

DESCRIPTION OF THE PREFERRED EMBODIMENTS

Figure 4:
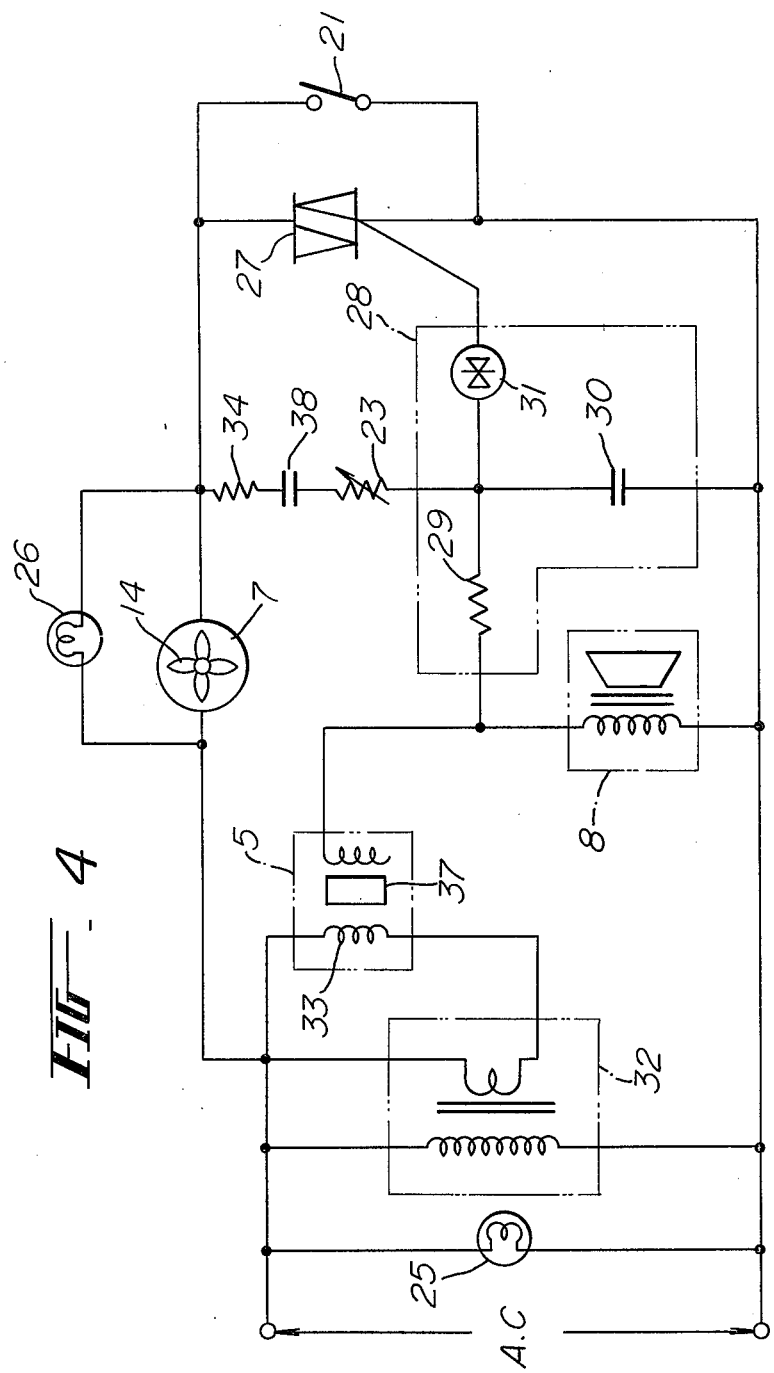
FIG. 4 is a circuit diagram of a control arrangement for the system shown in FIGS. 1-3.

FIGS. 1-3 illustrate an exemplary air-purifying system according to the present invention.

Reference numeral 2 designates an inlet into which air to be purified is drawn. Reference numeral 3 designates a body of reducing-gas-absorbing material. Reference numeral 4 designates the front of the exterior of the illustrated air-purifying system and is the portion from which the purified air emerges after undergoing purification.

Numeral 5 is a sensor device which is capable of detecting the concentration of reducing gases or other harmful gases in the air in the room in which the air-purifying system is located. The sensor unit 5 is connected to an electronic control circuit 6 which controls the operation of a motor 7 and also the operation of a warning device 8. This can be clearly seen in FIG. 3. The control circuit 6 is connected to a suitable power source by means of a plug 24.

The motor 7 is mounted on a support plate 10 by means of screw 9, and furthermore secured to a panel 13 by means of screws 12.

The motor 7 has an output shaft upon which is mounted a fan 14. The fan 14 rotates within an air guide 15. The absorbing agent is held in a container 16, and the container is mounted in a support member 17, with a further air guide member 18 being secured to the rear part of support member 17.

Palladium, manganese catalyst, active terra alba or active carbon are preferable for use as the absorbing agent; however, other known purifying substances can also be employed.

The end cover 18 (visible both in FIGS. 1 and 3) is removably mounted, thereby facilitating replacement of the absorbing agent 3a and its container 16.

The cover portion 18 is provided with a net 19 to prevent the passage of large particles into the air-flow path of the air-purifying system. Alternatively, this net can be furnished within the container 16, and it is also advantageous to provide a plurality of nets, of successively finer mesh.

When the fan 14 rotates, air and impurities are drawn into the airflow passage of the system, entering via the annular end portion 18. Any large dust particles or otherlarge particles are caught by the net 19. Harmful gases are absorbed by the absorbing agent 3. Accordingly, the air emerging from the front end 4, via hole 20 in front panel 13, will have been purified.

Numeral 21 (see FIG. 4) designates a manual mode-selection switch capable of setting the air-purifying system either for automatic or else for simple continuous operation. By setting the switch 21 to one side to open it beforehand, the fan motor 7 will be automatically turned by a signal issued from the sensor device 5 when the concentration of reducing gases in the air within the room increases. By setting the switch 21 to the other side to close it, the fan motor simply continues to turn independently of the sensor device 5.

Numeral 22 designates a dial for adjusting the sensitivity of the sensing arrangement 5. Turning of the dial 22 effects adjustment of a variable resistor 23 (FIG. 4), making it possible to set the air-purifying system 1 and the warning arrangement 8 to different threshold values.

After the power plug 24 is plugged into a source of power, and the switch 21 is set to automatic mode, the dial 22 is turned, when the air in the room is substantially free of impurities, in the clockwise direction a predetermined amount, so that the motor 7 commences to turn and so that the air-purifying system will commence to operate. This means a condition in which the impurities in the air has exceeded a predetermined limit. The dial is thereafter turned a small distance in the opposite direction, until the motor 7 is caused to stop; with the air-purifying system set in this manner if the detected concentration of impurities rises above the thusly established limit, the air-conditioning system 1 will automatically begin to operate, and if despite the operation of the air-conditioning system the concentration of impurities continues to rise, the warning device 8 will issue a warning signal.

With reference to FIG. 4, it is noted that numeral 25 designates a power-indicating lamp, connected across the power input and becoming illuminated when the system is connected to power. Numeral 26 designates a motor-operation indicator lamp, connected in parallel with the motor 7, and becoming illuminated with the motor is energized.

The explanation of the control 6 shown in FIG. 4 is as follows:

Numeral 5 is a gas sensing arrangement comprised of a metal oxide semiconductor element (for example a Taguchi Gas Sensor made by Figaro Tec. Inc.), the conductivity of which increases when the sensor absorbs smoke or reducing gases. Numeral 8 designates an acoustical warning device capable of generating a warning signal. Numeral 7 designates, as before, the motor for the fan 14. Numeral 27 is a controllable electronic switch element such as a triac or any other suitable electronic switch element. Numeral 28 designates an ignition circuit for the switch element 27, and is comprised of a resistor 29, a capacitor 30 and a diac 31, which is a constant voltage discharging element. Numeral 32 designates a transformer which slightly heats the gas sensing member 5 and furnishes a suitable voltage to the heater coil 33 as one electrode of the gas sensing member 5. Numeral 23 designates a variable resistor, and numeral 34 designates a protective resistor. Numeral 21 is the mode selection switch mentioned earlier.

The gas-sensing member 5 and one terminal of the warning device 8 are connected in series to form a warning circuit.\* The motor 7 and one terminal of the switch element 27 are connected in series to form a circuit path for the motor current.

\* and the other terminal of the warning device 8 is connected, through the ignition circit 28 and the switch element 27, to the motor 7.

The resistor 29 of the ignition circuit 28 and the capacitor 30 are connected in series between both terminals of the warning device 8, and the diac 31 is connected between the junction of capacitor 30 and resistor 29 and the gate of triac 27. Numeral 37 designates a gas-responsive material in the gas-sensing arrangement 5, and numeral 38 designates a phase-adjustment capacitor.

The illustrated arrangement operates in the following manner:

When the device is set for automatic operation, the switch 21 is in its illlustrated open position. If the air in contact with the gas-sensing material 37 of the sensor 5 has a low concentration of impurities, the material 37 will be of high resistance, and both the motor 7 and the warning device 8 will be non-operative. When reducing gas or smoke comes into contact with the gas sensing arrangement 5, and as the impurities in the air within the room increase, the resistance of the gas-sensing material in the arrangement 5 decreases, and the voltage applied to the warning device 8 increases. Accordingly, the voltage applied to capacitor 30 likewise increases. When the voltage across capacitor 30 reaches the voltage breakdown value of the diac 31, the diac breaks down, and the capacitor 31 is rapidly discharged to thereby produce a gating pulse for triac 27. The triac 27 becomes conductive for the duration of this gating pulse, thereby permitting the flow of a current pulse through the current path of the motor 7. In this way, the motor 7 begins to turn the fan 14. The power supply is A.C., and as will be understood by persons skilled in the art, the gating of switch element 27 will be periodic, so that motor 7 will be furnished with periodic energizing pulses.

If the concentration of impurities in the air rises further, the voltage applied to the warning device 8 increases up to a predetermined level, in response to which a warning signal is issued. Conversely, if the concentration of impurities in the air decreases, the resistance of the gas sensing arrangement 5 increases, and the voltage applied to warning device 8 decreases, so that the warning signal ends. If this concentration of impurities in the air decreases still further, the level of the voltage applied to capacitor 30 will not reach a peak magnitude sufficient to gate triac 27, and accordingly motor 7 will not be furnished with energizing pulses.

In the non-automatic mode-selection switch 27 is closed, thereby providing a current path for the motor independently of the concentration of impurities in the air within the room.

As a further possibility according to the invention, the coil of a relay could be connected in parallel with the warning device 8, with the relay-switch of the relay being connected in series with the fan motor 7, so that the switch may be opened when the relay coil is energized in case the device has been set in a mode of manual operation. By means of such a modification of the control circuit, the fan motor 7 can be stopped simultaneously with the issuance of a warning signal by the warning device 8.

The illustrated arrangement can operate in two different ways:

1. The device is ordinarily inoperative, i.e., motor 7 is normally unenergized. However, if the concentration of reducing gases or impurities in the air within the room rises above a predetermined level, the motor 7 becomes energized. If the concentration of impurities rises still further, the warning device 8 issues a warning signal.

2. The device is normally operative, and when the concentration of impurities in the air exceeds a predetermined level, the warning device issues a warning signal, and the fan motor 7 either is automatically de-energized at this time, or else continues to operate.

In either case, the warning signal is issued to direct the occupants of the room to open one or more windows or to turn a ventilating fan. As a result, it is possible to prevent dangerous increases of the concentration of impurities in the air within a room. Even if the occupants of the room are asleep, they will be wakened by the warning signal.

It will be understood that each of the elements described above, or two or more together, may also find a useful application in other types of circuits and constructions differing from the types described above.

While the invention has been illustrated and described as embodied in an automatic air-purifying system, it is not to be considered limited to the details shown, since various modifications and structural changes may be made without departing in any way from the spirit or concept of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such modifications and adaptations should and are intended to be comprehended within the meaning and range of equivalence of the following claims.

What is claimed as new and desired to be secured by Letters Patent is set forth in the appended claims:

1. An automatic air purification system, comprising, in combination, electrically operated air-purifying means for purifying the air in an at least substantially enclosed space by removing chemical impurities from the air in such enclosed space, said air-purifying means comprising a body of reducing-gas-absorbing material and electrically operated fan means for causing air to pass through said body of reducing-gas-absorbing material; sensing means located in said enclosed space and operative for generating electrical signals having values indicative of the level of concentration of chemical impurities in the air contacting said sensing means; warning means operative for issuing a warning signal; and control means connected to said electrically operated fan means, connected to said sensing means and also connected to said warning means for controlling the operation of said electrically operated fan means and the operation of said warning means dependent upon said electrical signals generated by said sensing means.

2. A system as defined in claim 1, wherein said control means includes means for initiating operation of said fan means when the detected concentration of impurities in the air contacting said sensing means exceeds a predetermined value.

3. A system as defined in claim 1, wherein said electrically operated fan means includes an electrical fan motor, and wherein said control means includes a controllable electronic switch in the current path of said fan motor, said switch having a control input, and threshold detecting circuit means connected between said sensing means and said control input and operative for rendering said switch conductive when the signal at the output of said sensing means attains a predetermined value.

4. A system as defined in claim 1, wherein said control means comprises means operative for initiating operation of said electrically operated fan means in automatic response to generation by said sensing means of an electrical signal having a preselected first value indicative of a first concentration of chemical impurities, and means operative for causing said warning means to issue a warning signal in automatic response to generation by said sensing means of an electrical signal having a preselected second value indicative of a second concentration of chemical impurities greater than said first concentration, whereby an alarm signal is issued only when despite the operation of said purifying means the concentration of chemical impurities rises from said first to said second concentration.

5. A system as defined in claim 4, wherein said control means further includes selecting means for selecting one of said first and second values independently of the other of said first and second values.

6. A system as defined in claim 4, wherein said control means further includes selecting means for selecting said first value independently of said second value.

7. A system as defined in claim 4, wherein said control means includes means for terminating operation of said purifying means in automatic response to generation by said sensing means of an electrical signal having said preselected second value.

* * * * *